United States Patent [19]

Burger et al.

[11] Patent Number: 5,165,864
[45] Date of Patent: Nov. 24, 1992

[54] VACUUM PUMP UNIT

[75] Inventors: Heinz-Dieter Burger, Wertheim; Klaus Handke, Wertheim Wartberg, both of Fed. Rep. of Germany; Claude Saulgeot, Veyrier Du Lac, France

[73] Assignee: Alcatel Cit, Paris, France

[21] Appl. No.: 689,046

[22] PCT Filed: Jul. 3, 1990

[86] PCT No.: PCT/FR90/00502
§ 371 Date: May 17, 1991
§ 102(e) Date: May 17, 1991

[87] PCT Pub. No.: WO91/05166
PCT Pub. Date: Apr. 18, 1991

[30] Foreign Application Priority Data

Sep. 27, 1989 [FR] France ................ 89 12656

[51] Int. Cl.5 ............ F04B 49/06; F04B 37/14; F04B 41/06
[52] U.S. Cl. .................. 417/244; 417/2; 417/45
[58] Field of Search ................ 417/2, 45, 244

[56] References Cited

U.S. PATENT DOCUMENTS

| | | | |
|---|---|---|---|
| 2,936,107 | 5/1960 | Blackburn | 230/45 |
| 4,225,288 | 9/1980 | Mugele et al. | 417/247 |
| 4,596,514 | 6/1986 | Matsumoto et al. | 417/44 |
| 4,655,688 | 4/1987 | Bohn et al. | 417/45 |
| 4,699,570 | 10/1987 | Bohn | 417/6 |

FOREIGN PATENT DOCUMENTS 0308846 3/1989 European Pat. Off. .
1140189 2/1957 France .

Primary Examiner—Richard A. Bertsch
Assistant Examiner—David W. Scheuermann
Attorney, Agent, or Firm—Sughrue, Mion, Zinn, Macpeak & Seas

[57] ABSTRACT

A vacuum pump unit including a secondary pump sub-assembly (6) rotated by an electric motor M2 and applying suction to a chamber to be evacuated (1), and a primary pump sub-assembly (2) rotated by an electric motor M1 and whose suction is connected to the output of the secondary pump sub-assembly (6), the unit being characterized in that it includes an electronic control circuit (7) for controlling the speed of rotation of the electric motor M1 as a function of to the current I2 drawn by the electric motor M2.

5 Claims, 2 Drawing Sheets

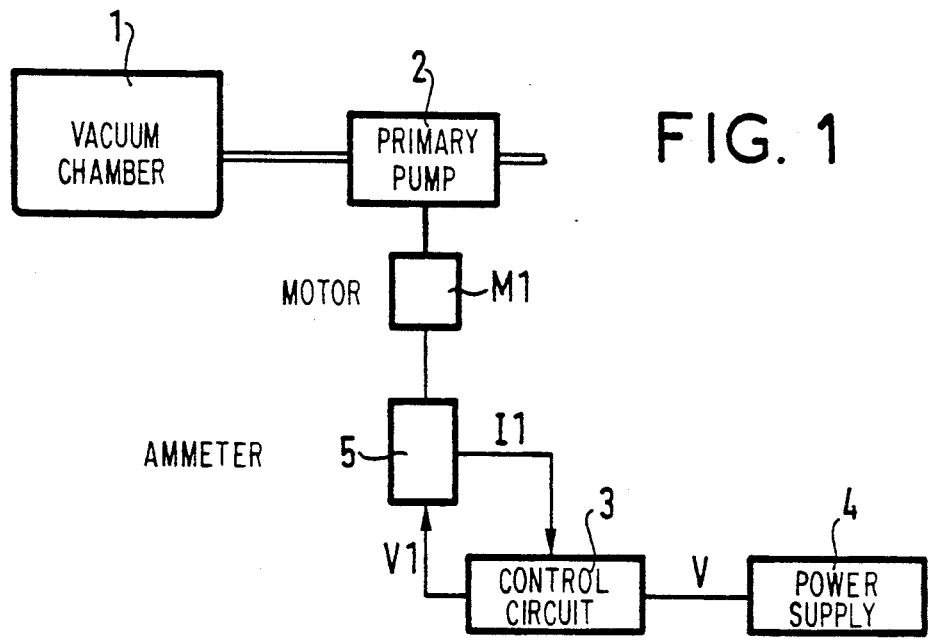
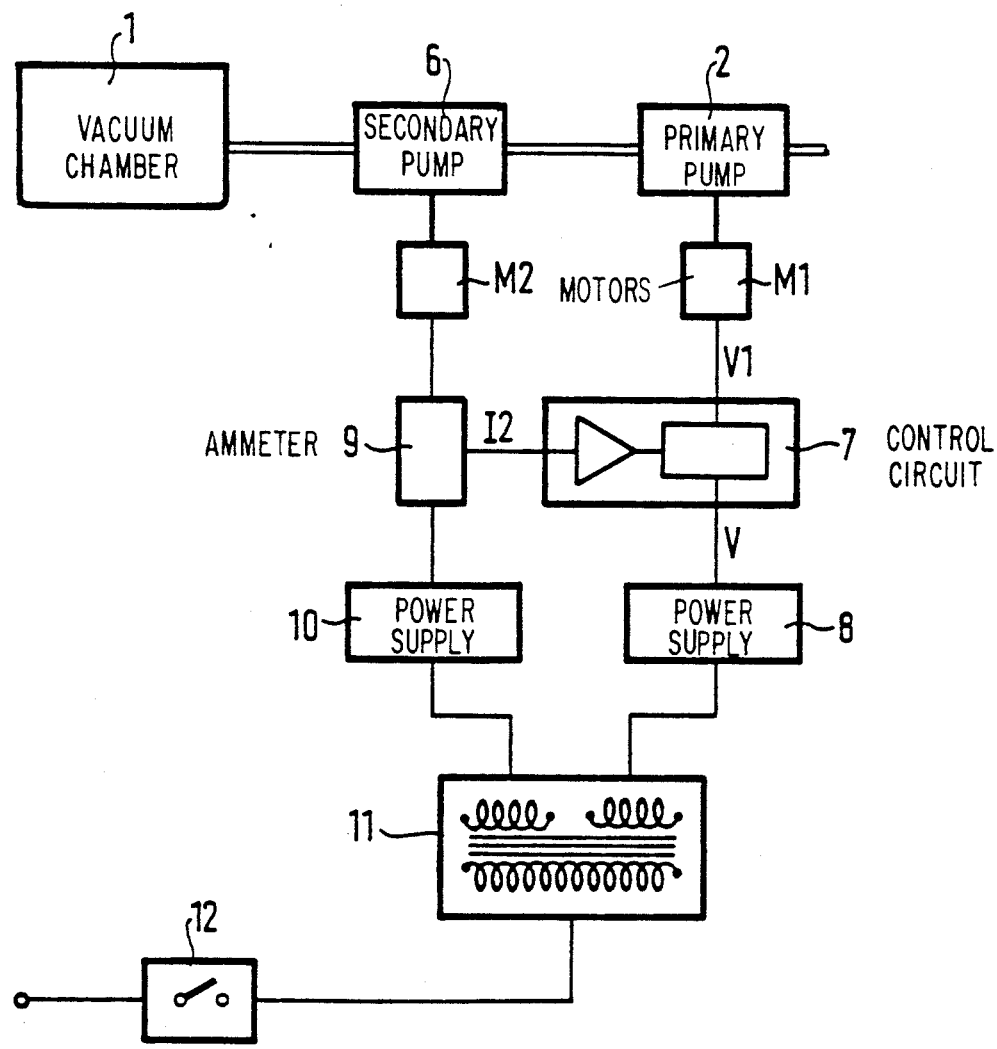

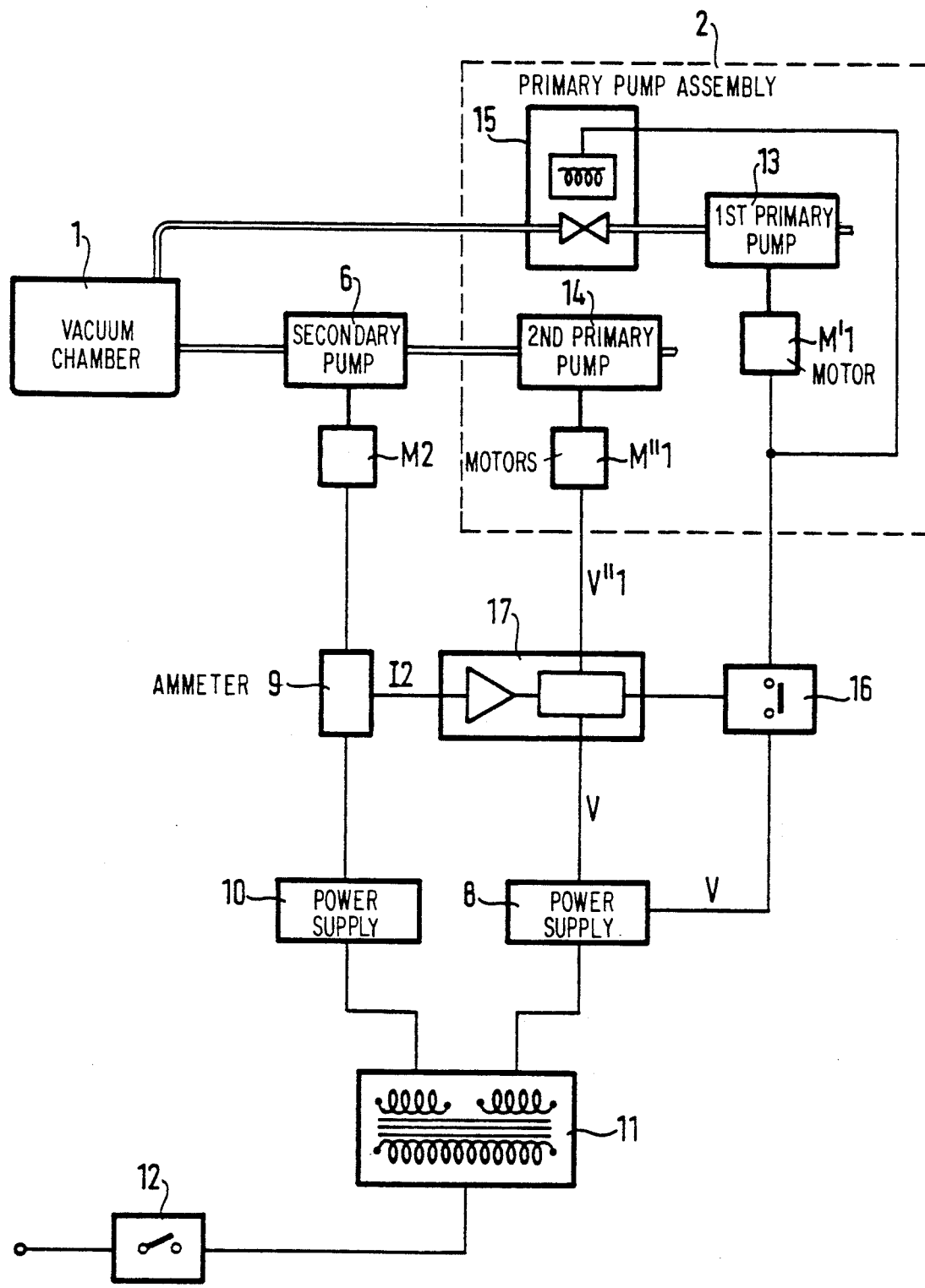

VACUUM PUMP UNIT

The present invention relates to a vacuum pump unit.

A vacuum pump unit is normally made up of a primary pump sub-assembly and a secondary pump sub-assembly, with the chamber to be evacuated being connected to the suction of the secondary pump sub-assembly.

It is known that the speed of rotation of the motor driving the secondary pump sub-assembly is servo-controlled to the pressure of the chamber to be evacuated, using a gauge to measure the pressure drop. Once the set pressure has been reached, this makes it possible to reduce the speed of the secondary pump and thus reduce wear.

However, vacuum pressure gauges are not very accurate.

The principle of the invention is to act not on the secondary pump sub-assembly but on the primary pump sub-assembly, and above all not to use a vacuum gauge, but to make direct use of the electric current drawn by the drive motor for the secondary pump sub-assembly or else for the primary pump sub-assembly when it is being alone.

Using this idea and depending on the various combinations used, the invention takes on three related forms.

In a first form, the invention provides a vacuum pump unit including a primary pump sub-assembly rotated by an electric motor, the unit being characterised in that it includes an electronic control circuit for controlling the speed of rotation of the motor as a function of the motor current.

In a second form, the invention provides a vacuum pump unit including a secondary pump sub-assembly rotated by an electric motor M2 and applying suction to a chamber to be evacuated, and a primary pump sub-assembly rotated by an electric motor M1 and whose suction is connected to the output of the secondary pump sub-assembly, the unit being characterised in that it includes an electronic control circuit for controlling the speed of rotation of the electric motor M1 as a function of the current drawn by the electric motor M2.

In a third form, the invention provides a vacuum pump unit including a primary pump sub-assembly and a secondary pump sub-assembly rotated by an electric motor M2 and applying suction to a chamber to be evacuated, the unit being characterised in that said primary pump sub-assembly comprises a high flow-rate first pump sub-assembly, rotated by an electric motor $M'1$ and a low flow-rate second pump sub-assembly rotated by an electric motor $M''1$ and whose suction is connected to the outlet of the secondary pump sub-assembly and in that an electronic control circuit stops the electric motor $M'1$ when the current drawn by the motor M2 falls below a pre-determined value.

According to another characteristic, said electronic control circuit additionally controls the speed of rotation of the electric motor $M''1$ as a function of the current drawn by the motor M2.

The system is simpler, more accurate and cheaper than using a vacuum gauge. Use is made of the current drawn by the drive motor of the secondary pump sub-assembly or else of the primary pump sub-assembly, if being used alone, knowing that said current is a function of the pressure in the chamber to be evacuated.

The invention is now described with reference to the accompanying drawings in which:

FIG. 1 is a diagram showing a vacuum pump unit of the invention including only a primary pump sub-assembly;

FIG. 2 is a diagram showing a vacuum pump unit of the invention and including both a secondary pump sub-assembly and a primary pump sub-assembly; and FIG. 3 is a diagram showing a vacuum pump unit of the invention in which the primary pump sub-assembly is itself subdivided into two sub-assemblies.

Turning to FIG. 1, a vacuum chamber 1 is shown connected to a primary pump sub-assembly 2, which may include one or more pumps. The primary pump sub-assembly 2 includes its own drive motor(s) M1. A potential V1 is applied to the drive motor(s) M1 by means of a control circuit 3 which receives both an input voltage V from a power supply 4 and a signal representative of the current I1 drawn by the motor M1 as determined by a current measuring circuit 5. The control circuit 3 delivers an output voltage V1 as a function of the current I1. More particularly, the control circuit 3 is a mere threshold circuit such that on starting up, and until the current I1 falls below below said threshold, the voltage V1 remains constant, and then drops to a lower value, for example, one-half. The drive motor M1 is a DC motor.

In the case of FIG. 2, the pump unit comprises a secondary pump sub-assembly 6 rotated by motor M2 and a primary pump sub-assembly 2 rotated by a DC motor M1.

The motor M1 is powered from a voltage V1 by an electronic control circuit 7 which receives both an input voltage V from a power supply 8 and a signal representative of the current I2 drawn by the drive motor M2, as determined by a current measuring circuit 9. The control circuit 7 outputs a voltage V1 as a function of the current I2 drawn by the motor M2. In a special case which is advantageous because of its simplicity, the control circuit 7 is merely a threshold circuit which produces an output voltage V1 that may take one or other of two values depending on whether the current I2 exceeds, or falls below, a predetermined value.

10 is the power supply for the motor M2, 11 is the power supply transformer and 12 the starter switch for the whole unit.

Thus the two pump sub-assemblies are switched on simultaneously. From atmospheric pressure down to about a few millibars, voltage V1 remains at maximum and motor M1 runs at maximum speed. The primary pump sub-assembly 2 works at its maximum rate and the time necessary to drop from atmospheric pressure to a few millibars is as short as possible. Once the secondary pump sub-assembly 6 starts working at a pressure at which it is efficient, in the region below 10 millibars, its current I2 decreases, and the voltage V1 is reduced to a low level. Thus the DC motor M1 rotates slowly and the flow through the primary pump sub-assembly 2 is reduced, but still sufficient to maintain the necessary pumping action of the secondary pump 6.

The primary pump sub-assembly 2 is used at full speed only for the time during which a high flow-rate is needed, i.e. while the secondary pump is not working at a pressure for which it is efficient; this effectively means pressures between atmospheric and a few millibars. This time is generally quite short, since it is easier to lower the pressure of a chamber from atmospheric down to a few millibars than it is subsequently to lower it from a few millibars to $10^{-6}$ mbars.

Finally, FIG. 3 shows a pump unit in which the primary pump sub-assembly 2 is itself divided up into two sub-assemblies: a high flow-rate first primary pump sub-assembly 13 driven by an electric motor M'1 and a low flow-rate second pump sub-assembly 14 driven by electric motor M"1. The high flow-rate primary pump sub-assembly 13 is connected directly to the vacuum chamber 1 by means of electrically controlled valve 15.

As shown in FIG. 2, the sub-assembly 14 is connected to the outlet side of the secondary pump sub-assembly 6.

Motor M'1 driving the high flow-rate primary pump 13 is powered by a power supply 8 via a switch 16 controlled by a control circuit 17 which receives both an input voltage V from the power supply 8 and, as in preceding cases, a signal representative of the current I2. At its outputs it supplies both a control signal to switch the switch 16 on or off and a voltage V"1 as a function of the current I2.

In this example, the high flow-rate sub-assembly 13 operates only during the pre-evacuating stage, for as long as the current I2 remains above a predetermined value. Then, switch 16 is switched off, stopping the pump 13, and the electrically controlled valve 15 is closed, with only pump 14 operating thereafter.

Depending on circumstances, the control circuit 17 can supply either a constant output voltage V"1, independent of the current I2, or as in the preceding case, a lower voltage V"1 after the pressure in chamber 1 has fallen to a few millibars. M"1 is a DC electric motor.

The invention enables the pump(s) of the primary pump sub-assembly 2 rotate at full speed for a short time only, resulting in less wear, less electric power consumption, less heating, less vibration, and less noise. Furthermore, the high flow-rate pump 13 (FIG. 3) is completely stopped except while pre-evacuating. Finally, using current I2 from the secondary pump, or I1 in the case of FIG. 1, to regulate the primary pump sub-assembly 2 is simpler, more accurate and cheaper than using a pressure gauge.

We claim:

1. A vacuum pump unit including a secondary pump sub-assembly (6) rotated by an electric motor M2 and applying suction to a chamber to be evacuated (1), and a primary pump sub-assembly (2) rotated by an electric motor M1 and whose suction is connected to the output of the secondary pump sub-assembly (6), the unit being characterised in that it includes an electronic control circuit (7) for controlling the speed of rotation of the electric motor M1 as a function of to the current I2 drawn by the electric motor M2.

2. A vacuum pump unit according to claim 2, characterised in that said electric motor M1 is a DC motor, said electronic control circuit acting on the power supply voltage V1 of the motor M1.

3. A vacuum pump unit including a primary pump sub-assembly (2) and a secondary pump sub-assembly (6) rotated by an electric motor M2 and applying suction to a chamber to be evacuated (1), the unit being characterised in that said primary pump sub-assembly (2) comprises a high flow-rate first pump sub-assembly (13) rotated by an electric motor M'1, and a low flow-rate second pump sub-assembly (14) rotated by an electric motor M"1 and whose suction is connected to the outlet of the secondary pump sub-assembly (6) and in that an electronic control circuit stops the electric motor M'1 when the current I2 drawn by the motor falls below a predetermined value.

4. A vacuum pump unit according to claim 3, characterised in that said electronic control circuit (17) additionally controls the speed of rotation of the electric motor M"1 as a function of the current I2 drawn by the motor M2.

5. A vacuum pump unit according to claim 4, characterised in that said electric motor M"1 is a DC motor, said electronic control circuit acting on the power supply voltage V"1 of the motor M"1.

* * * * *